Figure 1:
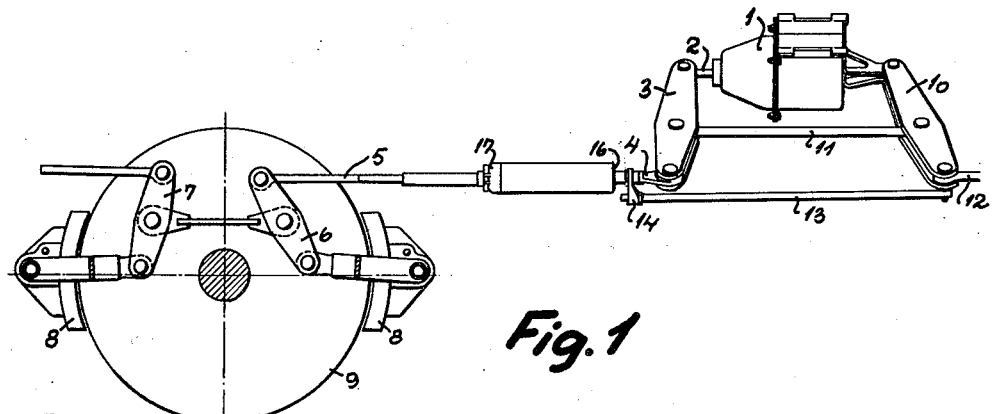

July 13, 1965  ÅKE J. BRANDT  3,194,358
SLACK ADJUSTER

Filed Jan. 9, 1964  2 Sheets-Sheet 2

INVENTOR.
Åke J. Brandt
BY
Watson, Cole, Grindle & Watson
ATTORNEYS

United States Patent Office

3,194,358
Patented July 13, 1965

3,194,358
SLACK ADJUSTER
Ake J. Brandt, Park Forest, Ill., assignor to American SAB Company, Inc., Chicago, Ill.
Filed Jan. 9, 1964, Ser. No. 336,666
4 Claims. (Cl. 188—196)

This invention relates to an automatic slack adjuster for brakes, especially for use in the brake rigging of railway cars.

More particularly, the invention relates to a double-acting slack adjuster, i.e., a device by means of which a too great slack in the rigging, e.g., resulting from wear, may be reduced and a too small slack, e.g., resulting from the replacement of brakes shoes, may be increased.

Still more particularly, the invention relates to a slack adjuster of the purely mechanical type comprising two interconnected brake rod parts which may be axially displaced relative to one another by means of a screw and nut connection.

It is the object of the invention to devise a slack adjuster of the type referred to which is cheap in manufacture and reliable in operation, which comprises a minimum number of moving parts and no exposed rotating parts, which is rapid in action both when taking up slack and when paying out, and which offers only a relatively low resistance to the transmission of the braking force.

It is a further object of the invention to devise a slack adjuster of the type referred to which is cheap in manufacture and reliable in operation, which comprises a minimum number of moving parts and no exposed rotating parts, which is rapid in action both when taking up and paying out slack.

From one point of view, the slack adjuster according to the invention may be characterized principally by the manner in which the various elements of which it is composed are arranged to engage with one another, either directly or indirectly, in the axial direction of the slack adjuster. For the purpose of such characterization, the following expressions will be used:

The forward direction is defined as the direction of movement, during application of the brakes, of the brake rod in which the slack adjuster is mounted. The expressions "front" and "rear" refer to the relative location of parts as viewed in the same direction. An element is said to be forwardly engageable with another element when the face exerted by the former element on the latter element is in the forward direction. The engagement may be either direct or indirect, i.e., through intervening elements. Similarly, an element is said to be rearwardly engageable with another element when the force exerted by the former element on the latter element is in the rearward direction. An element is said to be rotationally engageable with another element, when the engagement is of a character permitting substantially unrestrained mutual rotation of the two elements, e.g., through the intermediary of a ball bearing. Similarly, an element is said to be clutchably engageable with another element when the engagement is of a character offering substantial resistance to mutual rotation of the two elements. Examples of clutchable engagement are frictional engagement and toothed engagement. The line of distinction between rotational and clutchable engagement is whether the engagement is of a character to permit or prevent rotation of the nuts referred to below under the influence of axial forces.

As characterized from this point of view, an automatic slack adjuster according to the invention comprises an elongated housing, a front rod part extending into said housing from the front end thereof, a rear rod part extending into said housing from the rear end thereof, and being constructed with a steep screw thread, a locking nut and a feeding nut on said screw thread, said locking nut being forwardly rotationally engageable and rearwardly clutchably engageable with said front rod part, said feeding nut being forwardly clutchably engageable with said locking nut and rearwardly rotationally engageable with said front rod part through the intermediary of a biasing spring and means releasable on forward displacement of said front rod part relative to said housing, a feeding member rearwardly clutchably engageable with said housing and with said feeding nut and forwardly rotationally engageable with said housing, a biasing spring urging said housing forward relative to said first rod part, and an external reference stop engageable by the front end of said housing.

Figure 2:
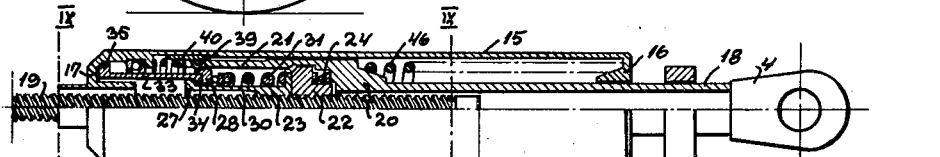
Figure 3:
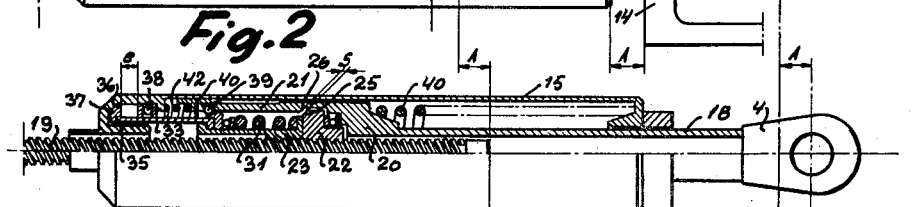
Figure 4:
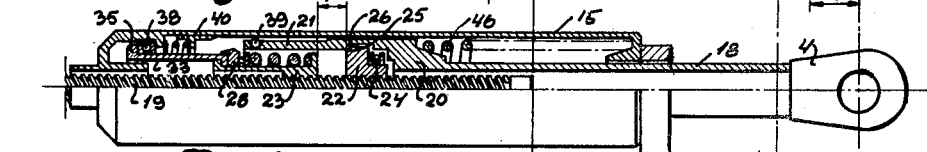
Figure 5:
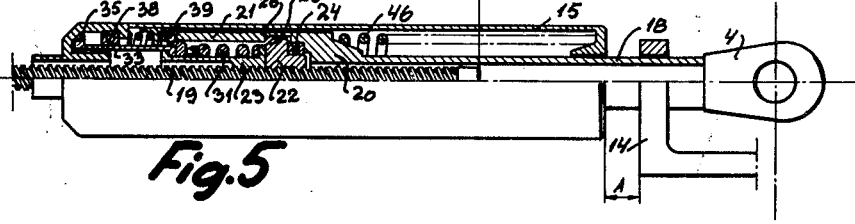
Figure 7:
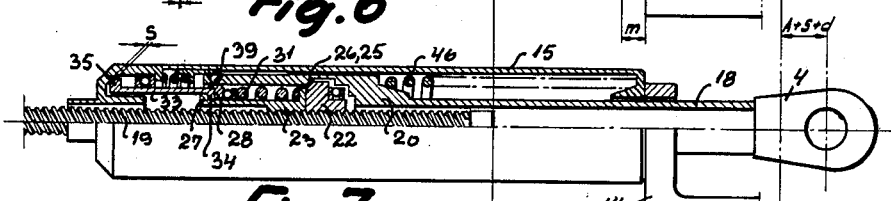
Figure 8:
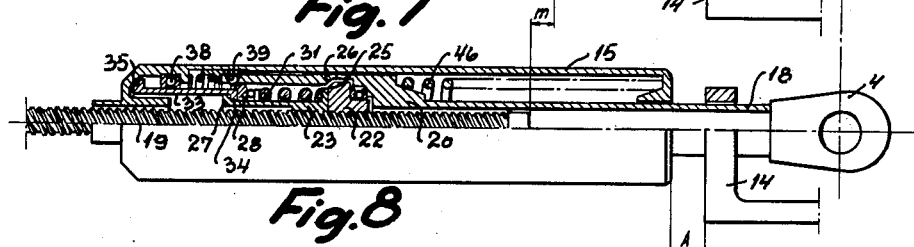
Figure 9:
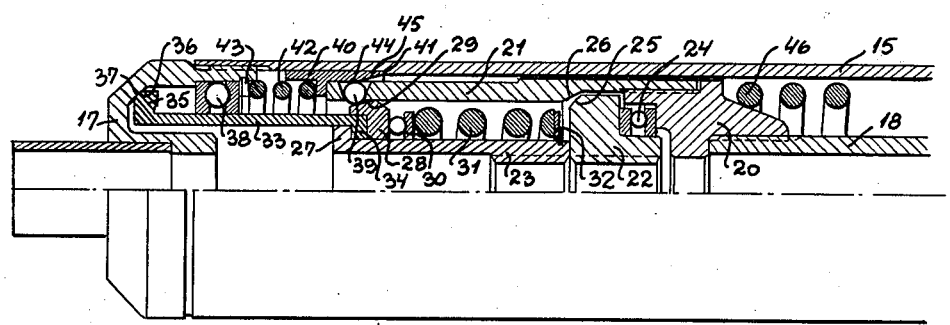

Further features and objects of the invention will be apparent to those skilled in the art from the following detailed description, reference being made to the accompanying drawings, in which:

FIG. 1 is a diagrammatic illustration of one example of a brake rigging in which a slack adjuster according to the invention may be used, FIG. 2 shows, on a larger scale, one form of a slack adjuster according to the invention, in side view in the lower half of the figure, and in axial section in the upper half of the figure, FIGS. 3–5 illustrate three different stages of a takeup operation of the slack adjuster of FIG. 2, FIGS. 6–8 illustrate three different stages of a paying out operation of the slack adjuster of FIG. 2, and FIG. 9 is a view similar to FIG. 2, but on a larger scale and only illustrating the part of the slack adjuster between the lines IX—IX in FIG. 2.

Referring first to FIG. 1, 1 is a brake cylinder provided with a piston rod 2 which is pivotally connected to one end of a live brake lever 3, the other end of which is connected to a cross head 4 forming a part of a slack adjuster. The left hand or rear end of the slack adjuster is a part of a rod 5, the extreme left end of which is connected to a lever system comprising a live brake lever 6 and dead brake lever 7 for applying blocks 8 against a wheel 9. A dead brake lever 10 is pivotally connected to a bracket on the brake cylinder 1 and is connected to the live brake lever by a rod 11. The end of the dead brake lever 10 remote from the cylinder 1 is pivotally connected to a rod 12 which is adapted to be connected to a lever system for applying the brakes of another wheel. However, in order to simplify the following explanation, it will be assumed that the rod 12 is always kept stationary seeing that it is well known in the art that this makes no difference as regards the function of the brake rigging or the slack adjuster. A rod 13 carrying a reference stop 14 is also pivotally connected to the said remote end of the dead brake lever 10. Thus, for the purposes of the following explanation, the reference stop 14 may be assumed to be stationary.

The brake rigging just described and shown in FIG. 1 is of conventional type. The slack adjuster according to the invention may of course be used in any other conventional type of brake rigging provided that the required space is available.

Referring now particularly to FIGS. 2 and 9, the slack adjuster there illustrated comprises an elongated housing 15 consisting of a cylindrical shell closed at its front end by means of a front cover or plug 16, and at its rear end by means of a rear cover or plug 17. A front rod part 18 extends into the housing 15 from the front end thereof, and a rear rod part 19 extends into the housing 15 from the rear end thereof. The front rod part 18 is rigidly connected to the cross head 4, FIG. 1, and is constructed in the form of a tube carrying at its rear end a collar member 20 to which a sleeve 21 is attached so as to extend rearwardly therefrom. The collar member 20 and the sleeve 21 will be referred to in the following as the head of the front rod part 18. From this point of view, the axial bore of the sleeve 21 forms an enlarged portion of the axial bore of the tubular front rod part 18.

The rear rod part 19 constitutes the front end of the rod 5 illustrated in FIG. 1 and is constructed in the form of a spindle having a steep screw thread, i.e., a screw thread the pitch of which is such that a nut engaged with the thread may be caused to rotate when exposed to an axial force (non-self-locking thread).

The front end of the rear rod part 19 extends into the axial bore of the head 20, 21 and front rod part 18 and is slidably guided therein, the clearance between these parts shown in FIGS. 2–8 being merely illustrative, the rear rod part being moreover entirely omitted in FIG. 9 to simplify the illustration.

The rear rod part 19 carries two nuts, viz., a front nut 22 referred to in the following as the locking nut, and a rear nut 23 referred to in the following as the feeding nut. A ball bearing 24 carried by the locking nut 22 is freely slidable in the bore of the collar member 20. At its rear end, the locking nut 22 is constructed with an inclined face 25 which is engageable with an inclined shoulder face 26 in the interior of the bore of the sleeve 21. In this manner, applying the above definitions, the locking nut 22 is forwardly rotationally and rearwardly clutchably engageable at a clearance between faces provided in the interior of the head 20, 21.

The feeding nut 23 has a front face which is frictionally (thus clutchably) engageable with a rear face of the locking nut 22. The feeding nut is constructed with an outwardly projecting collar 27 at the rear end thereof. A coupling ring 28 is slidably mounted on the feeding nut 23 adjacent the rear end thereof. The coupling ring 28 is constructed at its circumference with a rearwardly and inwardly inclined coupling face 29. In the neutral position of the slack adjuster, i.e., the position in which no axial forces are transmitted through the slack adjuster, the coupling ring 28 is located inside the bore of the head 20, 21 adjacent the rear end thereof. The coupling ring 28 forms one race of a ball bearing, the other race of which is denoted by the reference character 30. A biasing compressional spring 31 is inserted between the ball bearing race 30 and a fixed support 32 adjacent the front end of the feeding nut.

A feeding member in the form of a sleeve 33 extends rearwardly from the feeding nut 23 and is constructed at its front end with an inwardly projecting collar 34 clamped between the collar 27 of the feeding nut 23 and the coupling ring 28 under the influence of the biasing spring 31. At its rear end, the feeding member 33 is constructed with a radially outwardly extending portion 35, which is constructed at an inclined rear face thereof with a conical coupling face 36 engageable with a corresponding conical face 37 provided on the inner wall of the rear plug 17 of the housing of the slack adjuster, thus constituting a clutchable engagement between the feeding member 33 and the housing 15.

A ball bearing 38 is mounted in a fixed position in the housing at some distance in front of the position occupied by the portion 35 of the feeding member 33 in the neutral position of the slack adjuster.

A plurality of balls 39 is provided in inwardly tapering radial holes of the sleeve or head portion 21 in positions such as to engage the coupling face 29 of the coupling ring 28 in the neutral position of the slack adjuster. A sleeve 40 is slidably mounted inside the housing 15 and is urged forwards against a shoulder face 41 under the influence of a biasing spring 42 interposed between said sleeve and a fixed abutment 43 so that when not subjected to forces in the rearward direction, the sleeve 40 will occupy a predetermined position within the housing. The sleeve 40 is constructed with a cylindrical coupling face portion 44 in a position to be engaged by the coupling balls 39 in the neutral position of the slack adjuster, and an outwardly and forwardly inclined coupling face portion 45 commencing immediately in front of the zone of engagement of the coupling balls 39 with the cylindrical coupling face portion 44 in the neutral position of the slack adjuster.

A biasing compressional spring 46 is inserted between the front face of the collar member 20 (forming part of the head of the front rod part 18) and the front plug or cover 16 of the housing 15.

The operation of the slack adjuster will now be described with particular reference to FIGS. 2–8 of the drawing. Briefly, the operating principle may be described as follows:

During the braking stroke, the braking force is transmitted through the slack adjuster which thereby travels to the right in FIG. 1, or in other words travels in the direction defined above as the forward direction. If, during this travel, the housing 15 of the slack adjuster does not strike the reference stop 14 before a certain braking force has been developed, this is an indication that the slack of the brake rigging is too small, and pay-out is therefore required. If on the other hand the housing 15 does strike the reference stop 14 and is detained thereby, and the front rod 18 thereafter continues to travel beyond a certain predetermined distance before the full braking pressure is developed (or is not reached at all) this is an indication that the slack of the brake rigging is too great and take-up is required.

FIGS. 2 and 9 illustrate the positions occupied by the parts of the slack adjuster in the neutral position thereof, i.e., the position of the slack adjuster when no axial forces are transmitted therethrough. FIG. 2 also illustrates that in the neutral position of the brake rigging, the right hand end of the housing 15 of the slack adjuster is located at a distance A from the reference stop 14.

When braking starts, the braking force may be transmitted from the front rod part 18 to the rear rod part 19 by two alternative ways, viz., either via the biasing spring 46, the housing 15, the feeding member 33, the coupling ring 28, the ball race 30, the biasing spring 31 and the feeding nut 23, or via the balls 39 directly to the coupling ring 28 and then again via the ball race 30 and the biasing spring 31 to the feeding nut 23 which engages with the screw thread of the rear rod part 19 and is prevented from rotating relative thereto by the clutchable engagement between the collar 27 of the feeding nut 23 and the collar 34 of the feeding member 33, and the clutchable engagement between the portion 35 of the feeding member 33 and the rear end of the housing.

The transmission of the braking force will take the former path if the braking force is lower than the bias of the spring 46, while it will take the latter path if the braking force is higher than the bias of the spring 46.

As regards the latter transmission path, it is to be noted that since the balls 39 engage with the cylindrical coupling face portion 44, FIG. 9, of the sleeve 40, they are prevented from moving radially outwards and are thereby forced to transmit forward axial forces from the sleeve 21 (forming part of the head of the front rod part 18) to the coupling face 29, FIG. 9, of the coupling ring 28.

Assuming now that the braking force in the front rod part 18 does not reach the value of the bias of the spring 31 before the right hand end of the housing 15 strikes the reference stop 14, then all the parts of the slack adjuster will remain in the relative positions illustrated in FIGS. 2 and 9 until this occurs, as illustrated in FIG. 3 from which it will be seen that the cross head 4 has been moved to the right through the distance A, but no relative movement of the parts of the slack adjuster has taken place.

When the front rod part 18 now continues to travel to the right, the housing 15 remains stationary. The clutching engagement between the faces 36 and 37 is therefore released, and owing to the relative movement between the head portion 21 and the sleeve 40, the balls 39 arrive at the inclined surface portion 41 and are thereby released, with the result that the two nuts 22, 23 may now be displaced relative to the head portion 21 so as to establish engagement between the coupling faces 25 and 26. By the engagement, the braking force is now transmitted from the front rod part 18 to the rear rod part 19 via the locking nut 22, the latter being prevented from rotating on the rear rod part by the "clutchable" (frictional) nature of the said engagement.

The result of the release of the coupling faces 36, 37 is that the indirect clutchable engagement of the feeding nut 23 with the housing 15 through the feeding member 33 is interrupted so that the feeding nut 23 now becomes free to rotate. At this juncture, however, no axial forces act on the feeding nut 23, because its former axial coupling to the front rod part 18 was released at the balls 39, so that it will not rotate, but will continue to move to the right along with the rear rod part 19 on which it is carried, the latter being now axially coupled to the front rod part 18 through the locking nut 22.

If the continued travel to the right of the assembly of the front rod part 18, the locking nut 22, the rear rod part 19, the feeding nut 23 and the feeding member 33, until the full braking pressure has been developed, is not long enough to bring the portion 35 of the feeding member 33 into engagement with the ball bearing 38, no further changes take place, and when the braking force is released, all the occurrences described just take place in the reverse order. It is to be noted, however, that the yieldable mounting of the sleeve 40 by means of the biasing spring 42 and the shoulder 41 facilitates the re-entering of the balls into the space between the cylindrical coupling face portion of the sleeve 40 and the inclined coupling face 29 of the coupling ring 28.

The braking operation just described is a normal braking operation during which no slack adjustment has taken place.

Suppose, however, that the travel of the front rod part 18 continues through a certain distance P beyond the distance which the portion 35 of the feeding member 33 has to travel before engaging the ball bearing 38. When this occurs, the feeding nut 23 is detained by the said engagement, and since the rear rod portion 19 continues its travel to the right owing to its axial coupling to the front rod part 18 via the locking nut 22, the feeding nut 23 will rotate on the rear rod part 19 together with the feeding member 33 and will thereby be screwed rearwards on the screw thread of the rear rod part 19. The relative positions which the parts occupy on completion of the additional travel P is illustrated in FIG. 4. From this figure it will be seen that the total travel of the cross head 4 beyond the position illustrated in FIG. 3 is $P+e+S$, where $e$ is the distance between the portion 35 of the feeding member 33 and the ball bearing 38 is the neutral position of the slack adjuster, and S is the axial clearance between the inclined shoulder 26 of the sleeve 21 (front rod part 18) and the inclined face 25 of the locking nut 22. It will also be seen that the locking nut 22 and the feeding nut 23 have now been spaced apart at a mutual distance equal to P.

When the braking force is released, the restoring force of the brake rigging will pull the rear rod part 19 to the left, and this pull is transmitted to the front rod part 18 via the locking nut 22 and the inclined faces 25 and 26, the engagement of the latter preventing the locking nut 22 from rotating on the rear rod part 19. The feeding nut 23 is free to rotate but will not do so because it is just idling and it will therefore follow the rearward movement of the rear rod part 19. No changes of the relative positions of the parts occur until the portion 35 of the feeding member 33 is again engaged with the rear end of the housing 15. Thereby, the feeding nut 23 becomes again locked against rotation, and as soon as the right hand end of the housing 15 has been disengaged from the reference stop 14 and the restoring pull transmitted through the slack adjuster has decreased below the bias of the spring 46, the latter is capable of expanding, thereby displacing the housing 15, the feeding member 33, the feeding nut 23 and the rear rod part 19 as one solid entity to the right relative to the front rod part 18. The locking nut 22 will at first take part of this displacement, thereby disengaging the inclined faces 25 and 26, but as soon as it becomes axially engaged with the front rod part 18 through the ball bearing 24, it will be prevented from taking further part of the said axial displacement and since it is now free to rotate, it will be screwed relatively rearwards on the screw thread of the rear rod part 19 until it engages the feeding nut 23.

On completion of the brake release stroke, the housing of the slack adjuster will again be in the position relative to the reference stop 14 illustrated in FIG. 2. Towards the end of the relative movements just described, the balls 39 will again be introduced between the coupling ring 28 and the sleeve 40 in the same manner as described in connection with a normal braking operation.

The positions now occupied by the parts of the slack adjuster is illustrated in FIG. 5. It will be seen that all parts of the slack adjuster are in exactly the safe positions as in FIG. 2, with the exception that the rear rod part 19 has been moved relatively forwards through the distance P, meaning that the slack has been reduced by the amount P.

It will now be explained how the slack adjuster operates if the slack is too small, e.g., owing to replacement of braking shoes. As previously explained, the criterion of too small slack is that the braking force transmitted through the slack adjuster increases beyond a certain value already before the housing 15 engages the reference stop 14. Suppose that this occurs when the front end of the housing 15 is still at a distance $m$ from the reference stop 14 as illustrated in FIG. 6.

Up to this point the operation of the slack adjuster has been the same as in the case of normal braking, the braking force having been transmitted via the direct path from the sleeve 21 (front rod part 18) via the balls 39 the coupling ring 28, the ball race 30, the biasing spring 31 and the feeding nut 23 to the rear rod part 19, seeing that in this case the braking force is obviously greater than the bias of the spring 46.

Figure 6:
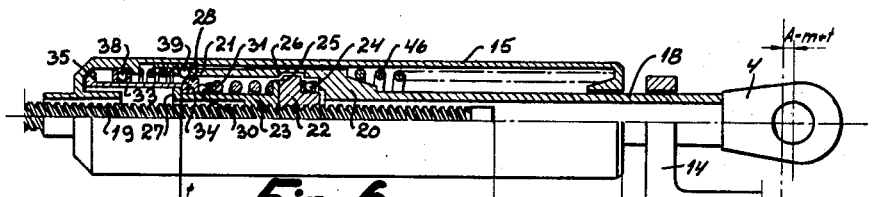

Now, the bias of the spring 31 has been selected equal to the said certain value at which the slack adjuster should react, and consequently in the position illustrated in FIG. 6, the spring 31 will yield. As soon as this occurs, the clamping engagement of the collar 34 of the feeding member 33 between the coupling ring 28 and the collar 27 of the feeding nut 23 is released, the feeding nut 23 following up the slight yielding movement of the coupling ring 28 under the influence of the biasing spring 46, so that no axial forces will occur between the flanges 34 and 27, but these may in fact become slightly spaced apart. The feeding member 33 consequently can no longer prevent the feeding nut 23 from rotating, and since the latter is subjected to an axial force viz., the braking force, and since the locking nut 22 with which it is in engagement is also free to rotate at the ball bearing 24, both nuts 23 and 22 will start rotating, thereby being screwed forwards on the screw thread of the rear rod part 19. This movement is followed up by the housing 15 under the influence of the biasing spring 46, which keeps the housing in engagement with the coupling ring 28 via the feeding member 33.

This state of things continues until the right hand end of the housing 15 strikes the reference stop 14. When this occurs, the power transmission path from the front rod part 18 to the coupling ring 28 via the balls 39 is interrupted as previously described, because the balls 39 become free to move radially outwards, and a power transmission path is established from the front rod part 18 to the locking nut 22 via the inclined faces 25, 26 instead, whereby the locking nut 22 is again prevented from rotating. This position is illustrated in FIG. 7 and is in fact the same as that illustrated in FIG. 3. The slack adjustment has now been completed and the braking may be continued until the full braking force has been developed. During the development of the full braking force, the axial distance between the portion 35 of the feeding member 33 and the ball bearing 38 will decrease but it will not be eliminated.

FIG. 8 illustrates the position after the brakes have again been released, and from a comparison of FIGS. 6 and 8 it will be seen that the amount of slack increase that was established during the braking stroke is equal to the distance $m$ in FIG. 6.

I claim:

1. An automatic slack adjuster for brakes, comprising an elongated housing, a front rod apart extending into said housing from the front end thereof, a rear rod part extending into said housing from the rear end thereof and being constructed with a steep screw thread, a locking nut and a feeding nut on said screw thread, said locking nut being forwardly rotationally engageable and rearwardly clutchably engageable with said front rod part, said feeding nut being forwardly clutchably engageable with said locking nut and rearwardly rotationally engageable with said front rod part, a coupling member slidably mounted on said feeding nut, a biasing spring urging said coupling member rearwardly relative to said feeding nut, ball means engageable between said coupling member and said front rod part, means for releasing said ball means from such engagement upon forward displacement of said front rod part relative to said housing, a feeding member rearwardly clutchably engageable with said housing and with said feeding nut and forwardly rotationally engageable with said housing, a biasing spring urging said housing forwards relative to said first rod part, and an external reference stop forwardly engageable by said housing.

2. An automatic slack adjuster for brakes, comprising an elongated housing, a front rod part extending into said housing from the front end thereof, a rear rod part extending into said housing from the rear end thereof and being constructed with a steep screw thread, a front nut and a rear nut carried by said screw thread in engagement therewith, biasing and stop means for keeping said front rod part and said nuts in predetermined positions relative to said housing in axial engagement with one another in the neutral position of the slack adjuster, said front rod part and said front nut being locked against mutual rotation and said two nuts being mutually non-rotatable when so engaged, means for preventing rotation of said rear nut in the neutral position thereof, but permitting such rotation on forward displacement of said rear nut relative to said housing, coupling means for axially coupling said rear nut to said front rod parts, said coupling means being releasable on forward movement of said front rod part relative to said housing from its neutral position therein and being constructed to liberate said rear nut for rotation upon increase of the axial force transmitted by said coupling means beyond a predetermined value, means for axially coupling said front nut to said front rod part on axial displacement of the latter relative to said housing from its neutral position therein, said means being constructed to lock said front nut and said front rod part against mutual rotation, stop means for limiting forward movement of said rear nut relative to said housing without preventing rotation thereof, and an external reference stop for limiting forward movement of said housing.

3. An automatic slack adjuster for brakes, comprising an elongated housing, a front rod part extending into said housing from the front end thereof, a rear rod part extending into said housing from the rear end thereof and being constructed with a steep screw thread, a front nut and a rear nut carried by said screw thread in engagement therewith, biasing and stop means for keeping said front rod part and said nuts in predetermined positions relative to said housing in axial engagement with one another in the neutral position of the slack adjuster, said front rod part and said front nut being mutually rotatable, and said two nuts being locked against mutual rotation when so engaged, means effective in the neutral position of said front rod part for axially coupling said rear nut thereto, alternative means effective upon forward displacement of said front rod part relative to said housing for axially coupling said front nut thereto, means for interconnecting the assembly of said nuts against relative rotation in the neutral position of the slack adjuster, means for liberating the assembly of said nuts for rotation on increase of the pull transmitted by the front rod part, while still in its neutral position, beyond a certain value, and for stopping such rotation on displacement of said front rod part from its neutral position in said housing, means for rotationally detaining said rear nut on travel thereof beyond a certain distance from its neutral position, and an external reference stop for limiting forward movement of said housing.

4. An automatic slack adjuster for brakes comprising an elongated housing, a front rod part extending into said housing from the front end thereof and constructed with an enlarged head inside said housing, said front rod part and head being constructed with an axial bore which is enlarged in the zone of said head, a rear rod part extending into said housing from the rear end thereof, said rear rod part having a steeply screw threaded portion extending into the bore of said front rod part and head without engaging therewith, a locking nut and a feeding nut carried by said screw threaded portion in engagement with the screw thread thereof, said locking nut being forwardly rotationally and rearwardly clutchably engageable at a clearance between faces provided in the interior of said head adjacent the front end thereof, said feeding nut being located to the rear of said locking nut and being forwardly clutchably engageable therewith, said feeding nut being constructed with an outwardly projecting collar at the rear end thereof, a coupling ring slidably mounted on said feeding nut adjacent the rear end thereof, said coupling ring being constructed at its circumference with a rearwardly and inwardly inclined coupling face, said coupling ring being located in the neutral position of the slack adjuster inside said bore of said head adjacent the rear end thereof, a biasing compressional spring between said coupling ring and a fixed support adjacent the front end of said feeding nut, said biasing spring being rotationally supported against said coupling ring, a feeding member extending rearwardly from said feeding nut and constructed at its front end with an inwardly projecting collar clutchably engageable between said coupling ring and said outwardly projecting collar of said feeding nut, said feeding member being constructed at its rear end with a radially extending portion which is rearwardly clutchably and forwardly rotationally engageable at a clearance between faces provided in the interior of said housing adjacent the rear end thereof, a plurality of coupling balls being provided in inwardly tapering radial holes of said head in positions such as to engage said coupling face of said coupling ring in the neutral position of the slack adjuster, a coupling face being provided interiorly of said housing, said coupling face having a cylindrical coupling face portion in a position to be engaged by said coupling balls in the neutral position of the slack adjuster and an outwardly and forwardly inclined coupling face portion commencing immediately in front of the zone of engagement of said coupling balls with said cylindrical coupling face portion in the neutral position of the slack adjuster, a biasing compressional spring in said housing between said head and the front end of said housing, and an external reference stop for limiting forward movement of said housing.

No references cited.

ARTHUR L. LA POINT, *Primary Examiner.*

DUANE A. REGER, *Examiner.*